(12) United States Patent
Rollinger et al.

(10) Patent No.: US 8,151,567 B2
(45) Date of Patent: Apr. 10, 2012

(54) ADAPTIVE LEARNING SYSTEM AND METHOD OF VANE POSITION FOR A VARIABLE GEOMETRY TURBOCHARGER

(75) Inventors: John Eric Rollinger, Sterling Heights, MI (US); David Bell, Plymouth, MI (US); Michael John Cullen, Northville, MI (US); Brien Lloyd Fulton, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 591 days.

(21) Appl. No.: 11/754,465

(22) Filed: May 29, 2007

(65) Prior Publication Data

US 2008/0295513 A1    Dec. 4, 2008

(51) Int. Cl.
*F02D 23/00*    (2006.01)
*F02B 33/44*    (2006.01)

(52) U.S. Cl. ......................................... 60/602; 60/605.2
(58) Field of Classification Search .............. 415/1, 118, 415/165; 60/600, 602, 605.1, 605.2; 700/100
See application file for complete search history.

(56) References Cited

U.S. PATENT DOCUMENTS

| | | | | |
|---|---|---|---|---|
| 4,428,199 A * | 1/1984 | Moore et al. | ..................... | 60/600 |
| 5,346,359 A * | 9/1994 | Propst | ............................... | 415/1 |
| 5,754,446 A * | 5/1998 | Fisher et al. | .................. | 700/287 |
| 6,035,639 A | 3/2000 | Kolmanovsky et al. | | |
| 6,035,640 A * | 3/2000 | Kolmanovsky et al. | ...... | 60/605.2 |
| 6,067,800 A | 5/2000 | Kolmanovsky et al. | | |
| 6,128,902 A * | 10/2000 | Kolmanovsky et al. | ...... | 60/605.2 |
| 6,247,311 B1 * | 6/2001 | Itoyama et al. | .................. | 60/602 |
| 6,418,719 B2 | 7/2002 | Terry et al. | | |
| 6,510,692 B2 | 1/2003 | Shirakawa | | |
| 6,665,604 B2 * | 12/2003 | Arnold | .......................... | 701/100 |
| 6,672,060 B1 | 1/2004 | Buckland et al. | | |
| 6,681,573 B2 * | 1/2004 | Arnold | ............................ | 60/602 |
| 6,708,104 B2 | 3/2004 | Avery, Jr. et al. | | |
| 6,732,522 B2 | 5/2004 | Wright et al. | | |
| 6,910,329 B2 | 6/2005 | Bunting et al. | | |
| 6,973,785 B2 * | 12/2005 | Umehara et al. | .............. | 60/605.2 |
| 7,062,910 B2 * | 6/2006 | Inoue | ............................ | 60/605.2 |
| 7,111,461 B2 * | 9/2006 | Richey | ............................ | 60/602 |
| 7,137,252 B2 * | 11/2006 | Ando et al. | ..................... | 60/602 |
| 7,137,773 B1 * | 11/2006 | Mc Donald et al. | .............. | 415/1 |

(Continued)

FOREIGN PATENT DOCUMENTS

EP    1024272    8/2000

(Continued)

OTHER PUBLICATIONS

UK IPO, International Search for GB0809190.2, Sep. 8, 2008, United Kingdom, 1 page.

*Primary Examiner* — Thomas Denion
*Assistant Examiner* — Cameron Setayesh
(74) *Attorney, Agent, or Firm* — Julia Voutyras; Alleman Hall McCoy Russell & Tuttle LLP

(57) ABSTRACT

A method of operation for an engine system having a variable geometry turbocharger with a vane is disclosed. In one example, an EGR valve is closed while vane position is adjusted. The method can reduce vane positioning errors during engine operation.

19 Claims, 5 Drawing Sheets

U.S. PATENT DOCUMENTS

| | | | |
|---|---|---|---|
| 7,200,995 B2 * | 4/2007 | Schroeder et al. | 60/602 |
| 7,281,378 B2 * | 10/2007 | Gu et al. | 60/599 |
| 7,296,561 B2 * | 11/2007 | Shirakawa et al. | 123/493 |
| 7,328,577 B2 * | 2/2008 | Stewart et al. | 60/605.2 |
| 7,343,735 B2 * | 3/2008 | Wang et al. | 60/286 |
| 7,343,738 B2 * | 3/2008 | Tsutsumoto et al. | 60/295 |
| 7,437,874 B2 * | 10/2008 | Ramamurthy et al. | 60/602 |
| 7,568,339 B2 * | 8/2009 | Noelle et al. | 60/605.1 |
| 2002/0100278 A1 * | 8/2002 | He et al. | 60/600 |
| 2002/0144674 A1 * | 10/2002 | Wang et al. | 123/568.21 |
| 2003/0145591 A1 * | 8/2003 | Arnold | 60/602 |
| 2004/0112053 A1 | 6/2004 | Yamada et al. | |
| 2004/0134192 A1 * | 7/2004 | Umehara et al. | 60/605.2 |
| 2005/0172628 A1 | 8/2005 | Fukasawa et al. | |
| 2006/0257237 A1 * | 11/2006 | McDonald et al. | 415/1 |
| 2006/0288701 A1 * | 12/2006 | Ramamurthy et al. | 60/602 |
| 2007/0214787 A1 * | 9/2007 | Noelle et al. | 60/602 |
| 2008/0245070 A1 * | 10/2008 | Allain et al. | 60/605.2 |

FOREIGN PATENT DOCUMENTS

| | | |
|---|---|---|
| WO | 01/55575 | 8/2001 |

* cited by examiner

ADAPTIVE LEARNING SYSTEM AND METHOD OF VANE POSITION FOR A VARIABLE GEOMETRY TURBOCHARGER

BACKGROUND AND SUMMARY

Vehicle engine systems may include variable geometry turbochargers to supply compressed air and recirculated exhaust gas to the cylinders of the engine to increase operating efficiency, reduce emissions, and improve performance of the engine system. The variable geometry turbocharger may include vane(s) that may be adjusted via an actuator to alter the geometry of the turbine housing which in turn may affect exhaust flow of the variable geometry turbocharger. For example, at lower engine speeds with lower exhaust flow, the vanes may be adjusted to decrease the area of the variable geometry turbocharger intake in order to accelerate the exhaust gas causing the turbocharger turbine to spin faster thus reducing spool up time. As another example, at higher engine speeds with higher exhaust flow, the vanes may be adjusted to increase the area of the variable geometry turbocharger intake so as not to inhibit exhaust flow thus improving the efficiency of the variable geometry turbocharger. Accordingly, the vane(s) of the variable geometry turbocharger may be adjusted across the operating range of the engine system to increase efficiency of the variable geometry turbocharger.

A vane position sensor may be implemented to measure the position of the vane(s) in the variable geometry turbocharger so that accurate control of the variable geometry turbocharger may be achieved. However, degradation of the position sensor over time may decrease control accuracy of the variable geometry turbocharger, and may necessitate additional sensor diagnostics which can add considerable complexity to the overall system.

In one approach, a variable geometry turbocharger vane position may be estimated based on exhaust back pressure. In particular, a desired back pressure may be compared to a measured exhaust back pressure to determine the difference between a desired and measured exhaust back pressure. The difference may be used to determine the duty cycle for the variable geometry turbocharger. See, for example, U.S. Pat. No. 6,418,719.

However, the inventors herein have recognized some issues relating to the above approach. In particular, the above approach requires a sensor to measure exhaust back pressure, and such a sensor may not be present, or may be of insufficient accuracy to provide accurate position sensor estimation.

In one approach described herein, at least some of the above issues may be addressed by a method of operation for an engine system, the engine system having a variable geometry turbocharger with a vane, the vane having a variable position, the method comprising: adjusting a vane of the variable geometry turbocharger through a range of operation by stepping through a plurality of positions and holding at each of the plurality of positions, the range spanning from a substantially minimum position to a substantially maximum position of the variable geometry turbocharger; and adjusting operation of the engine based on a response to the vane adjustment.

In this way, aspects of engine operation may be controlled based on a vane position of a variable geometry turbocharger that may be accurately estimated without the need for a sensor to measure vane position (although a sensor additionally may be used, if desired to further improve accuracy). In other words, by intrusively stepping the vane through substantially the entire operating range from minimum to maximum (or maximum to minimum), the vane position may be repeatedly calibrated to a response parameter that may be used to accurately estimate vane position throughout vehicle operation.

Furthermore, an engine system that includes a vane position sensor may be made more robust by comparing the estimated vane position with a measured vane position in order to detect sensor performance degradation. In some embodiments, the inferred vane position may be used to infer an exhaust back pressure and exhaust system operation may be adjusted based on the inferred exhaust back pressure. Thus, by accurately inferring exhaust back pressure the need for an exhaust back pressure sensor may be eliminated and engine system robustness may be improved.

DETAILED DESCRIPTION

Figure 1:
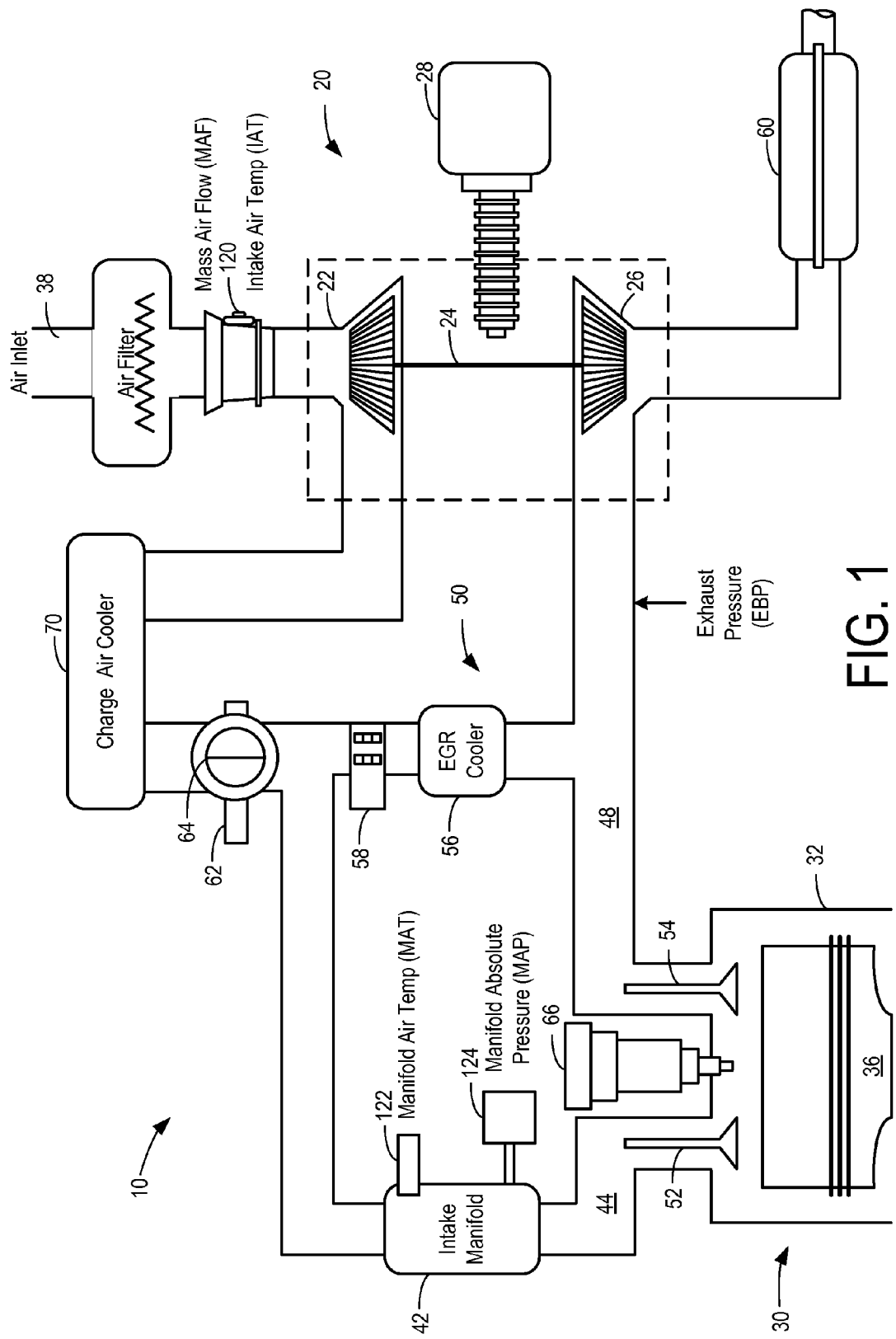
FIG. 1 shows one cylinder of a multi-cylinder engine and exhaust system configured for operation with a variable geometry turbocharger system.

FIG. 1 is a schematic diagram showing one cylinder of multi-cylinder engine 10, which may be included in a propulsion system of an automobile. Combustion chamber (i.e. cylinder) 30 of engine 10 may include combustion chamber walls 32 with piston 36 positioned therein. Combustion chamber 30 may receive intake air from intake passage 44 via intake manifold 42 and may exhaust combustion gases via exhaust passage 48. Intake passage 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In some embodiments, intake valve 52 and exhaust valve 54 may be controlled via electric valve actuation (EVA). Further in some embodiments, one or more of the intake and exhaust valves may be actuated by one or more cams, and may utilize one or more of cam profile switching (CPS), variable cam timing (VCT), variable valve timing (VVT), and/or variable valve lift (VVL) systems to vary valve operation. During some conditions, an engine system controller (not shown) may vary the signals provided to valves 52 and 54 to control the opening and closing of the respective intake and exhaust valves.

Fuel injector 66 is shown coupled directly to combustion chamber 30 for injecting fuel directly therein in proportion to the pulse width signal received from the engine system controller via an electronic driver. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake passage 44 in a configuration that provides what is known as port injection of fuel into the intake port upstream of combustion chamber 30.

In the illustrated embodiment, engine 10 is shown operating via compression ignition. However, in some embodiments spark ignition components (e.g. spark plug) may be included to operate engine 10 using spark ignition. Further, note that engine 10 may be configured to combust various fuels including diesel, gasoline, and ethanol among others.

Air enters engine 10 via air inlet 38. Intake sensor 120 may be arranged near air inlet 38 to measure the mass air flow (MAF) and/or intake air temperature (IAT) of the air. Air entering engine 10 may travel through a compression system. The compressed intake air passes through air cooler 70 to reduce the temperature and volume of the air. Air may be regulated into intake manifold 42 by intake throttle 62 having a throttle plate 64. In this particular example, the position of throttle plate 64 may be varied by a controller via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. Manifold air temperature (MAT) sensor 122 and manifold absolute pressure (MAP) sensor 124 may be disposed in intake manifold 42 to measure the temperature and pressure of the air entering cylinder 30.

Cylinder 30 may expel gas created during combustion into exhaust passage 48 via exhaust valve 54. Exhaust passage 48 may include one or more exhaust gas sensors (not shown) disposed upstream of emission control device 60. The sensor(s) may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Device 60 may be a three way catalyst (TWC), NOx trap, various other emission control devices, or combinations thereof. In some embodiments, during operation of engine 10, emission control device 60 may be periodically reset by operating at least one cylinder of the engine within a particular air/fuel ratio.

Operation of engine 10 may be controlled by a control system. In one example, the control system may be a microcomputer including a microprocessor unit, input/output ports, an electronic storage medium for executable programs and calibration (e.g. a read only memory chip), random access memory, keep alive memory, and a data bus. The control system may receive various signals from sensors coupled to engine 10, such as MAF, IAT, MAP, and MAT, among others. In some embodiments, engine control may be administered via a single engine controller. Alternatively, in some embodiments various aspects of engine operation may be controlled by specific controllers that may be distributed throughout the vehicle and linked to create an engine control system.

As described above, FIG. 1 shows only one cylinder of a multi-cylinder engine, and that each cylinder may similarly include its own set of intake/exhaust valves, fuel injector, spark plug, etc.

As noted above, air traveling into the air inlet and associated intake passage may be directed through a compression system prior to entering the cylinder in order to increase the density of combustible air in the cylinder so that power output of the engine may be improved.

In the illustrated embodiment, an exemplary compression system includes variable geometry turbocharger (VGT) 20 distributed between air inlet 38 and the associated intake passage and exhaust passages 48 of engine 10. The VGT may be used to regulate the boost level across the operating range of the engine. Specifically, the VGT may include a set of vanes disposed in the exhaust housing that may be adjusted to change the internal aspect ratio of the VGT. By changing the internal aspect ratio of the VGT via a change in vane position, the gas velocity may be regulated across the turbine.

For example, during conditions of low exhaust velocity the vanes of the VGT may be adjusted to be partially closed so that exhaust inlet area may be reduced, resulting in increased exhaust flow acceleration. The increased acceleration of the exhaust flow causes the turbine to spin faster than would be possible if the vanes where in a fully open position. Thus, by partially closing the vanes, the VGT may accommodate for low exhaust flow and provide desired boost with reduced spool up time. As another example, during a high exhaust flow condition, the vanes may be adjusted to be fully open so as not to inhibit exhaust flow as well as to accommodate release of exhaust pressure. In this way, the amount of compression provided to one or more cylinders of the engine via the VGT may be varied according to engine operation. Further, by changing the position of the vanes according to operating conditions, the variable geometry turbocharger may provide reduced turbo lag and a low boost threshold across the operating range of the engine resulting in increased power and efficiency of the engine.

In the illustrated embodiment, VGT 20 receives air through compressor inlet 22 located in the air intake passage. The compressor may be at least partially driven by a turbine 24 (e.g. via a shaft) arranged along exhaust passage 48. Gas exhausted from cylinder 30 may travel into turbine outlet 26 to drive the VGT. The VGT may include variable position vanes adjustable via vane actuator 28. Specifically, vane actuator 28 may adjust the distance between the vanes in the turbine to control the direction and flow acceleration of the exhaust flow into turbine outlet 26. By adjusting the acceleration and flow density of the exhaust flow entering the VGT operating efficiency of the VGT may be improved. For example, at low engine speeds the vanes may be adjusted to decrease the distance between the vanes in order to accelerate the exhaust flow to decrease spool up time of the VGT. As another example, at high engine speeds the vanes may be adjusted to increase the distance between the vanes (or to be substantially open) so that exhaust flow entering the VGT is not inhibited which may decreasing manifold pressure and reducing pumping losses.

A portion of exhaust gas exhausted from cylinder 30 into exhaust passage 48 may be recirculated to intake manifold 42 via exhaust gas recirculation (EGR) system 50. By recirculating exhaust gas back into cylinder 30, combustion temperatures may be lowered and NOx generation may be reduced. Furthermore, residual combustible elements of the recirculated exhaust gas may be combusted leading to increased engine efficiency. In the illustrated embodiment, exhaust gas may enter EGR recirculation system 50 via exhaust passage 48. In some embodiments, the exhaust gas may be cooled by EGR cooler 56 to generate a pressure differential as well as to increase exhaust gas flow density recirculated into intake manifold 42. EGR system 50 may include EGR valve 58 to regulate the timing and flow density of exhaust gas recirculated into intake manifold 42. Further, EGR flow may be generated according to a pressure differential created due to backpressure generated in the exhaust passage by the VGT using vane adjustment (e.g. closing the vanes to increase exhaust backpressure). Engine control based on exhaust back pressure (EBP) and inferring an EBP will be discussed in further detail below with reference to FIG. 4

In some embodiments, an EGR sensor (not shown) may be arranged within the EGR passage and may provide an indication of one or more pressure, temperature, and concentration of the exhaust gas. Under some conditions, the EGR system may be used to regulate the temperature of the air and fuel mixture within the combustion chamber, thus providing a method of controlling the timing of ignition during some combustion modes. Further, during some conditions, a portion of combustion gases may be retained or trapped in the combustion chamber by controlling exhaust valve timing.

Figure 2:
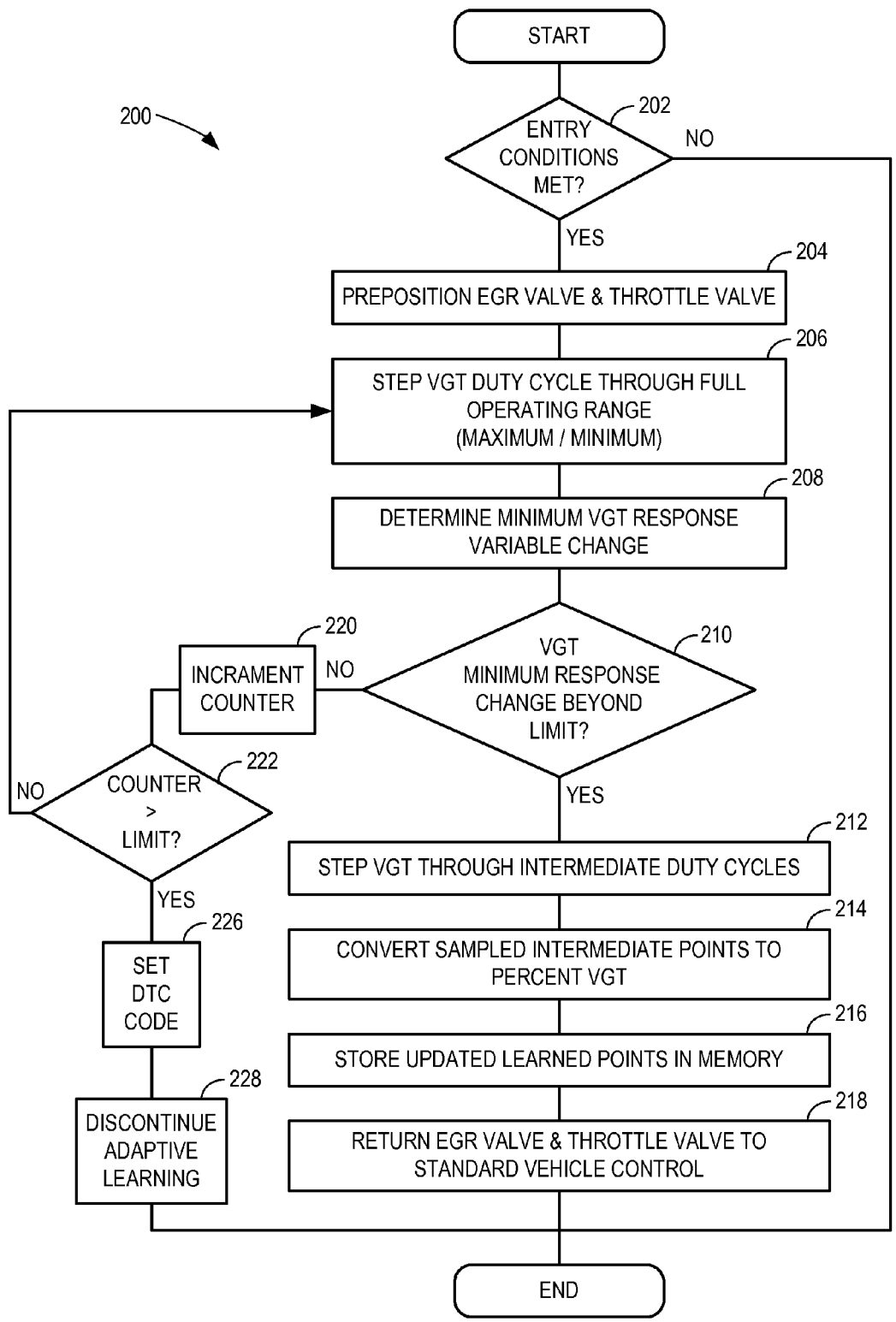
FIG. 2 shows a flow diagram of a control routine for an adaptive learning method for populating an inferred vane position of a variable geometry turbocharger.

Referring now to FIG. 2, an exemplary embodiment of a learning method is described herein for populating an inferred vane position of a variable geometry turbocharger as described above. The learning method or routine may populate the inferred vane position using only the output commanded duty cycle or current duty cycle inputs. The learning method advantageously allows for learning of output response variables that may be used to estimate or infer a vane position without the presence of a vane position sensor. By eliminating the need for sensor system complexity and cost of the variable geometry turbocharger and engine system may be reduced. Further, the inference of vane position may enable a variable geometry turbocharger equipped with a vane position sensor to be more robust because the inferred vane position may be compared to the sensor reading to determine that the sensor is functioning properly.

FIGS. 3A-3E show graphical representations of various response variables and other operating parameter relationships corresponding to the learning method and may be referenced throughout discussion of the learning method.

As will be appreciated by one of ordinary skill in the art, the specific routines described below in the flow diagrams may represent one or more of any number of processing strategies such as event-driven, interrupt-driven, multi-tasking, multi-threading, and the like. As such, various acts or functions illustrated may be performed in the sequence illustrated, in parallel, or in some cases omitted. Likewise, the order of processing is not necessarily required to achieve the features and advantages of the example embodiments of the invention described herein, but is provided for ease of illustration and description. Although not explicitly illustrated, one of ordinary skill in the art will recognize that one or more of the illustrated acts or functions may be repeatedly performed depending on the particular strategy being used. Further, these figures may graphically represent code to be programmed into the computer readable storage medium in a controller.

Learning routine 200 begins at 202, where a variety of entry conditions may be checked. The entry conditions may be checked to ensure that the conditions under which the learning adaptation is occurring are validly defined. In particular, since the transfer functions used for converting a response output of the VGT to a vane position are only valid under certain operating conditions the entry conditions may be checked to ensure that the adaptive learning is valid. Non-limiting examples of entry conditions may include maximum and minimum engine speeds, maximum and minimum air-flows, maximum and minimum fuel quantity, maximum and minimum oil temperature or pressure, and maximum vehicle speed. Additionally (or optionally), other inputs such as brake application and hardware fault statuses may be checked. In some embodiments, an amount of time where all other entry conditions are met may be used as another entry condition. In other words, meeting all conditions for at least a certain amount of time may enable entry into the adaptive learning method.

Furthermore, entry conditions may be checked so that adaptive learning may be performed with minimized impact to the vehicle operator. In particular, the intrusive cycling of the vanes of the variable geometry turbocharger may interrupt standard vehicle operation so adaptive learning may be performed such that operational impact may be reduced and vehicle drivability may be substantially unaffected. In one particular example, entry conditions may include low air-flow and engine speed, such as during an idle condition. By performing adaptive learning during an idle condition impact on vehicle operation may be reduced and estimation accuracy may be increased since during idle air flow may be stable and little variance in engine speed may exist.

If it is determined that the entry conditions are met, routine 200 moves to 204. Otherwise, routine 200 ends. Note that in some embodiments, if at least one of the entry conditions becomes unsatisfied the routine may be aborted or suspended in favor of alternate vehicle operation.

At 204, the EGR valve and the throttle valve may be adjusted to create a known or fixed EGR flow and throttle pressure variance. The known parameters may be used to calculate different response variables throughout the adaptive learning method. For example, in order to determine manifold absolute pressure (MAP), a known/fixed EGR flow and throttle pressure drop may be created. In one particular example, the EGR valve may be adjusted to be fully closed and the throttle valve may be adjusted to be fully (or substantially) open. The controller may adjust the positions with an open loop wait command. Alternatively, the controller may adjust the two valves and wait for the measured EGR valve position and throttle position to reach their commanded states. In some embodiments, known EGR and throttle valve positions may not be required based on measured response input, such as for example, exhaust manifold pressure.

Next at 206, the vane position of the VGT may be swept through the operating range of the duty cycle. During this sweep, at least a maximum VGT command and a minimum VGT command may be executed. Additionally, in some cases, several smaller steps may be added in between the maximum command and minimum command in order to reduce engine vibration and audible variations in engine noise during the vane movement that may be sensed by the vehicle operator. In one example, the VGT vane position may be intrusively stepped through a plurality of duty cycles and may be held at each of the plurality of duty cycles in order to generate a stable response output. In another example, the VGT vane position may be intrusively ramped through a plurality of duty cycles and may be held at each of the plurality of duty cycles in order generate a stable response output.

Figure 3A:
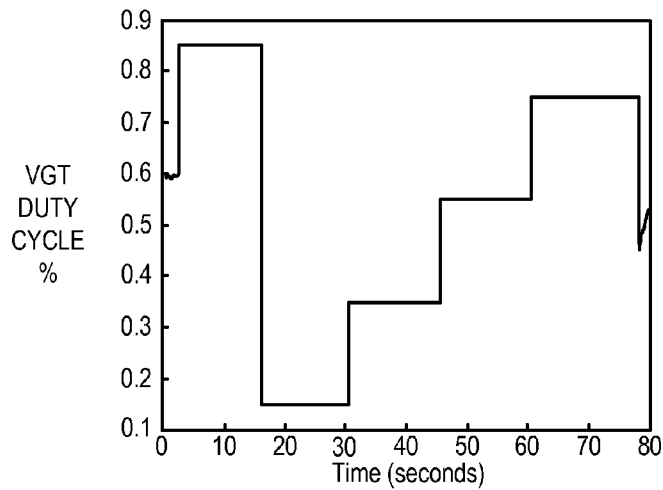
FIGS. 3A-3F graphically show representations of various response variables and other variable relationships corresponding to the adaptive learning method.

FIG. 3A shows one example of a VGT normalization sweep that intrusively steps through different duty cycles of the VGT vane operating range. The sweep begins with a commanded maximum (or substantially open) vane position or eighty five percent of the VGT duty cycle. Next, a minimum (or substantially closed) vane position or fifteen percent of the VGT duty cycle is commanded. The sweep may step from high to low in order to reduce time of the intrusive sweep by avoiding long bleed down time of the vane. Note that, in some cases, the normalization sweep of the VGT duty cycle may be stepped from low to high.

As the VGT vane is commanded through its full range of operation, sampling of one or more response parameters may be performed at least at each of the minimum and maximum commanded output duty cycles. In some embodiments, a response parameter may be sampled at each of the commanded steps of the sweep. In particular, since the vane position may be held at each step of the sweep, response parameter signal sampling may coincide with the hold operation. Further, sampling may be performed with a time offset or delay so that a signal may be allowed to stabilize after a step before being sampled in order to improve response signal accuracy.

Furthermore, the stepping operations may be adjusted to accommodate particular characteristics of the response parameter being sampled. For example, each of the steps of the normalization sweep may be extended (e.g. the hold time may be extended) in response to sampling of a noisy response parameter. In particular, each step may be extended in order to stabilize a signal at a particular duty cycle so that a valid measurement may be sampled. As another example, steps between duty cycles may be increased or decreased depending on characteristics of a particular response parameter, such as signal noise for example.

Figure 3B:
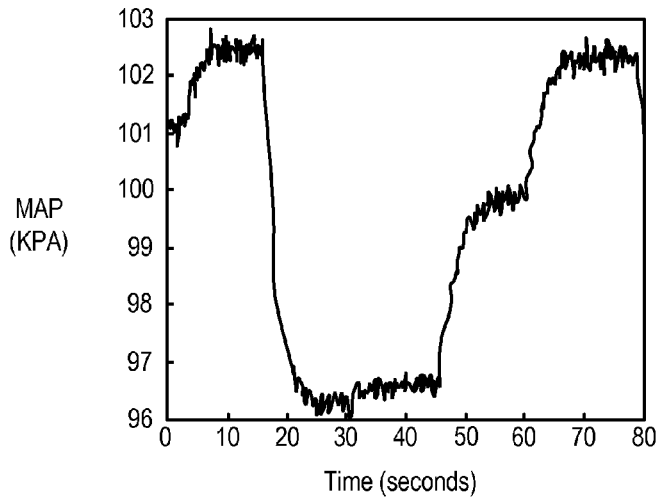

FIG. 3B shows the output response variable of the VGT normalization sweep. In this example, MAP is sampled and processed between the maximum and minimum commanded VGT vane position. As shown, the MAP signal stabilizes after a period of time after each step and may then be sampled and stored as a MAP value at the maximum vane position and a MAP value at the minimum vane position as well as at intermediate steps. In some embodiments, to determine that the response signal is stable and suitable for sampling, the MAP deviation over a predetermined time interval may be measured and once the MAP falls within a deviation threshold sampling may be performed.

After the response parameter has been sampled, a calculated error term between an expected response output change and the actual measured response output across the full-range of operation of the VGT may be generated at 208. In the example where the response output variable is MAP, the MAP at the minimum VGT command output is subtracted from the MAP at the maximum VGT command output to represent the actual response change. In some embodiments, the calculated expected response change may be based on a function of the Barometric pressure. In some embodiments, in a system with a particulate filter the calculated expected response change may be a function of the pressure upstream of the filter. Further, in some embodiments, this calculation may be generated from a lookup from information stored in memory or via a regression calculation.

Next at 210, a comparison may be made to see if the measured response change is at least equal to the minimum expected response change. If the response is beyond a limit then routine 200 moves to 212 and continues the adaptive learning cycle. In some embodiments, the limit may be calibrate-able based on various operating parameters of the VGT and engine system.

Otherwise, if the response is less than a limit it may be determined that the VGT vane did not move sufficiently to provide a response. Further, it may be determined that the VGT vane may be stuck. Thus, routine 200 may move to 206 and re-cycle the VGT output command through the full operating range of the vane and may sample the response. Further, the minimum expected response change may be recalculated and compared to the measured response change at 208. By sweeping through the duty cycle of the VGT again a valid normalization response output may be determined. Moreover, by sweeping through the duty cycle of the VGT again a stuck VGT actuator may be dislodged. Each time the VGT is re cycled through the normalization sweep while attempting to generate a suitable output response a counter may be incremented at 220.

At 222, the counter may be compared to a limit. If the counter is less than the limit the routine continues to attempt to generate a suitable response. If the counter is greater than the limit routine 200 moves to 226 and a diagnostic trouble code (DTC) to indicate a non-achievement in turbocharger response performance may be set in an on-board diagnostic (OBD) system.

Next at 228, adaptive learning may be discontinued responsive to setting of the diagnostic trouble code. In some embodiments, the adaptive learning routine may be temporarily suspended instead of discontinued. In some embodiments, the DTC may indicate degradation of one or more elements of the VGT and VGT operation may be discontinued in response to the DTC.

Figure 3C:
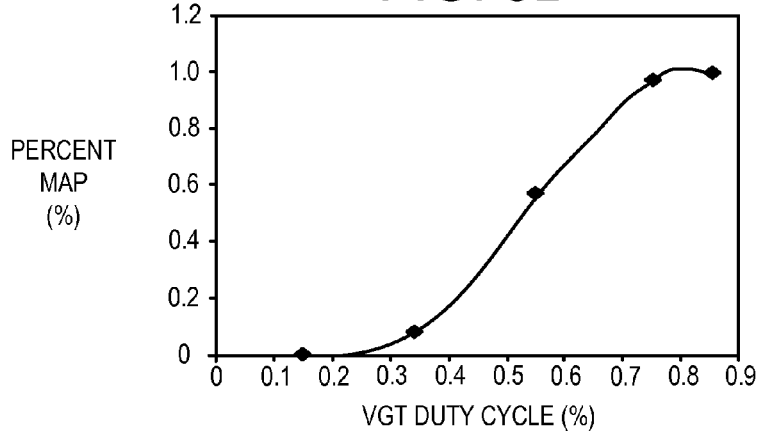

Continuing with routine 200, at 212, one or more VGT output commands corresponding to intermediate duty cycle positions may be cycled through to cause the VGT actuator to move to various positions in between the minimum and maximum positions. In one example, as shown in FIG. 3C, percent VGT duty cycle is the output parameter, and three duty cycles are chosen between the maximum and minimum positions. However, note that more or fewer points may be sampled depending on the intended regression method used to interpret the sampled data or based on other suitable factors.

In some embodiments, several smaller steps may be added in between the required duty cycle command steps for data collection in order improve operating transparency to the vehicle operator. In particular, variations in engine vibration and audible turbocharger indications may be reduced by adjusting the vane position in smaller steps. In some embodiments, the vane position may be dithered via the vane actuator during intrusive stepping of the duty cycle in order to improve stability and to reduce the likelihood of the vane becoming stuck.

Furthermore, the actual duty cycles that may be used to intrusively cycle the VGT may be determined via pre-determined values or through learning to optimize the span. For example, with reference to FIGS. 3A-3C, the lowest duty cycle point to sample, may be compared to a target amount (e.g. approximately 10 percent MAP). If the actual measured percent MAP at that point is smaller than the target, then the duty cycle output values may be increased accordingly for the next cycle. If the actual measured percent MAP at that point is larger than the target, then the duty cycle output values may be decreased accordingly for the next cycle. As such, the learned percent MAP values can be used to increase estimation accuracy of the VGT vane position.

Next at 214, the sampled response values may be converted to a percent VGT duty cycle. In one example, a pre-determined function (e.g. a transfer function) that is stored within controller memory may take an input of percent MAP as a percentage of the full range of VGT vane position, and may output a percent of the vane duty cycle. This function may be a straight one-to-one mapping, or may include a plurality of mappings that are a function of other operating conditions such as engine speed and air-flow. Since each individual transfer function is valid over a defined operating region, storing multiple transfer functions at multiple operating conditions (e.g. for several different engine speeds) may increase the valid range of usage for the adaptive learning method. In other words, different transfer functions may be implemented based on the checked entry conditions so that the adaptive learning routine may be more robust and may be valid over a greater range of vehicle operation.

Figure 3D:
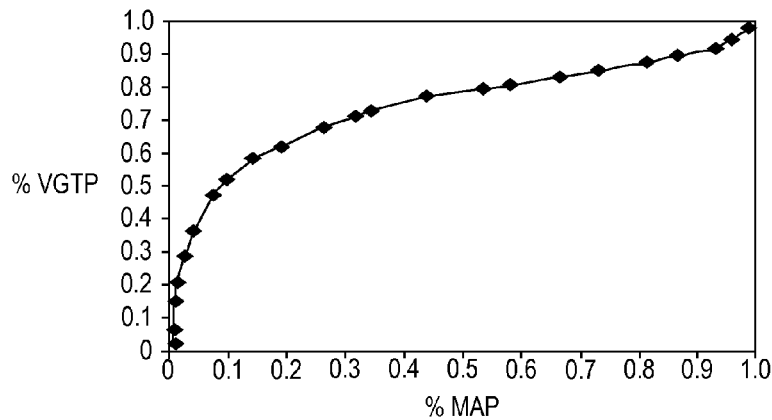

FIG. 3D shows an example transfer function as discussed above implemented to indicate a relationship between percent MAP and a percent inferred vane position of the VGT which may be used to infer vane position of the VGT. The transfer function output of FIG. 3D is generated from the sample percent MAP values of FIG. 3C.

Figure 3E:
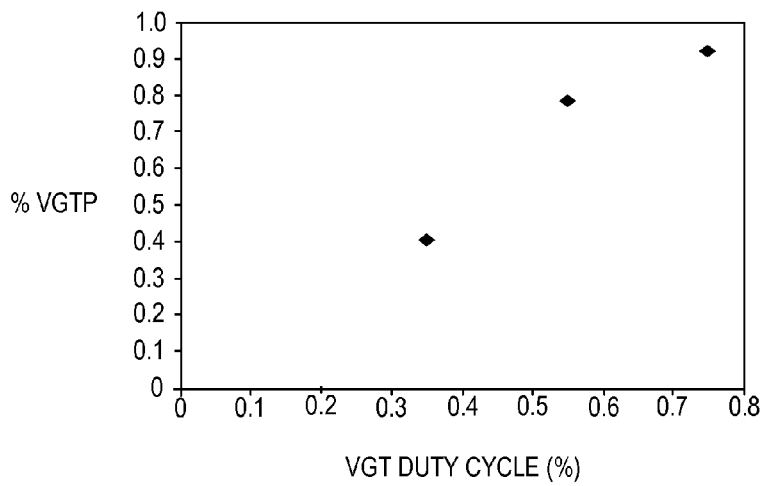

Next at 216, a value for each percent vane position at a respective commanded duty cycle may be stored in Keep Alive Memory (KAM). In one example, as shown in FIG. 3E, three inferred vane positions versus duty cycle may be calculated and stored in the KAM. In some embodiments, more or less values may be stored in memory. The inferred vane position values may be stored in the KAM by filtering a new percent vane position value into the previous value at the same duty cycle conditions. Alternatively, new inferred vane position values may be stored in the KAM according to a fixed percentage contribution that may be added/subtracted during each adaptation loop until the new value is stored. Over time, as the adaptive learning method is performed the method may facilitate faster learning based on the maturity, or number of learning cycles performed on the KAM since re-initialization of the KAM, thus resulting in quicker learning after clearing of the KAM.

Figure 3F:
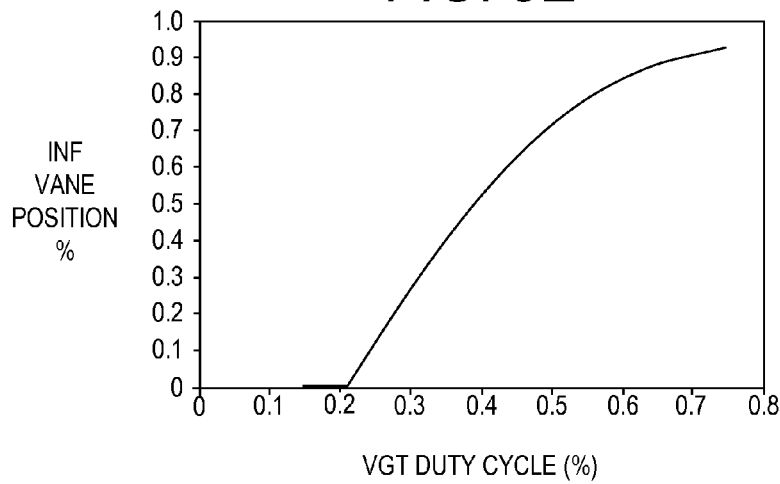

FIG. 3F shows a resulting second order curve of percent vane position versus duty cycle that may be generated from the calculated inferred vane positions versus duty cycle of FIG. 3E.

Next at 218, the adaptive learning routine has concluded and the EGR valve and throttle are no longer needed to be maintained at specified positions. Thus, if they were commanded to a pre-determined position for the learning routine, they can now be allowed to return to standard vehicle control operation. Note that adaptive learning routine 200 may be performed numerous times throughout vehicle operation to facilitate continued learning. Additionally, portions of the routine may be executed, suspended, and then restarted at a later point in the routine.

In some embodiments, the learning method may be performed in response to various operating conditions. For example, a learning cycle may be commanded after a memory (e.g. KAM) clear has been performed. Performing a learning cycle after clearing the memory may be desirable because the inferred vane position may be calibrated to the commanded duty cycle of the VGT. Further, execution of multiple learning cycles of the learning method may cause the calibration of the inferred vane position with the VGT duty cycle to occur quicker and more accurately and may be improved with each learning cycle. Further, a learning cycle may be executed after a clearing of an on-board diagnostic (OBD) code. The learning cycle may be used for diagnostic purposes to detect degradation in the VGT, in particular, the vane actuator, or a different engine system component.

Note that routine 200 may represent a single adaptive learning cycle for populating an inferred vane position and that multiple cycles may be executed to accurately infer the VGT vane position. Further, multiple learning cycles may be executed to maturate the adaptive learning of the inferred vane position in order to quickly and accurately calibrate the inference of the vane position with the duty cycle of the VGT.

Although MAP was implemented as a response variable to populate the inferred vane position according to the above learning method, it should be appreciated that the above described adaptive learning method may implement various other response variables to infer vane position. For example, the commanded input of the VGT mechanism may be a duty cycle, a pulse width, a current, or in the case of a system with a VGT vane sensor a commanded vane position. As another example, the measured output response variable may be intake manifold pressure, exhaust manifold pressure, or mass air-flow. Note that the use of manifold pressure or mass-air flow as response values may require a known EGR flow (or zero) and a known throttle angle (or fully open), whereas exhaust manifold pressure may not require known EGR flow and throttle position. Further, the use of mass-air flow may have lower signal to noise than the other signals, as the preferential operating conditions for intrusively moving VGT to allow learning are under conditions where air-flow during vane cycling is not affected much, such as during an idle condition.

Figure 4:
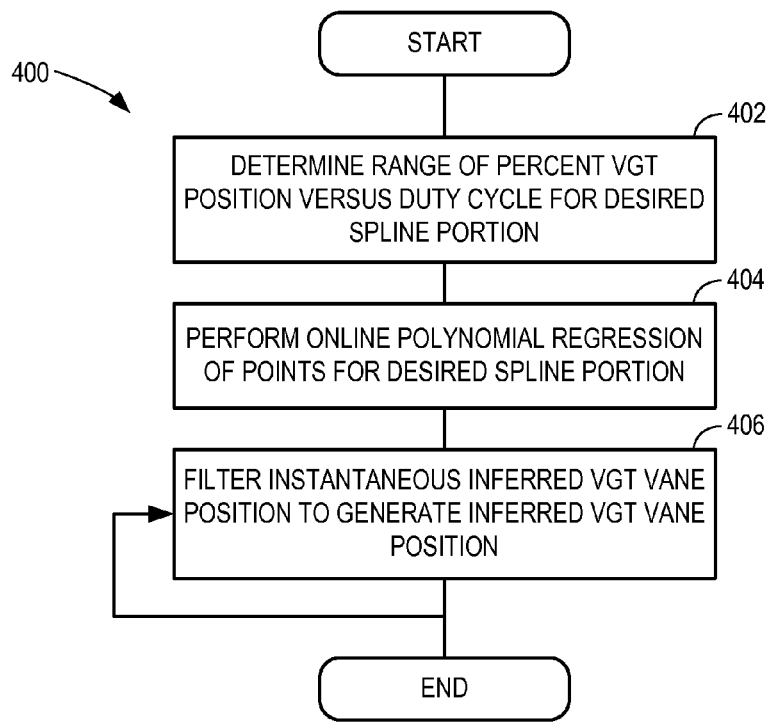
FIG. 4 shows a flow diagram for inferring a VGT vane position.

In one example, the above described learning method may be further refined to produce an inferred VGT vane position from the inferred vane position versus duty cycle as shown in FIG. 3E. Referring now to FIG. 4, a routine for inferring or estimating a VGT vane position that may be applied to the above learning method is described. Routine 400 may infer a VGT vane position from a commanded (or current) VGT duty cycle and may be implemented to infer a VGT van position which may be used in place of a vane position sensor. The inferred VGT vane position may be used for purposes of control of the VGT and other engine system parameters.

Routine 400 begins at 402, where a range of percent VGT vane position versus duty cycle included in a desired spline may be determined. The determined range may include points that correspond to potential estimates of VGT vane position.

Next at 404, online polynomial regression may be performed on the points for the current spline portion. The polynomial regression may generate a curve that provides an instantaneous inferred VGT position for a given (current or commanded) percent duty cycle.

Next at 406, the instantaneous inferred VGT vane position may be filtered to generate the inferred VGT vane position. It should be appreciated that filtering may be performed multiple times to generate a suitable inferred VGT vane position value.

The above described learning method and VGT vane position inference routine may be implemented collectively to adaptively learn the vane position of the VGT based on stored or learned information relating to the commanded duty cycle of the VGT. By using the learning method to infer the vane position a vane position sensor of the VGT may be eliminated, thus reducing the complexity and cost of the VGT and related systems. Further, the learning method may be applied to make a VGT with a vane position sensor more robust. In particular, during VGT operation sensor readings may be compared with the inferred vane position generated from the learning method in order to verify functionality of the sensor. The learning method may further be used to advantage in generating an inferred exhaust back pressure (EBP) value that may be used for EGR valve and VGT control purposes.

In some embodiments, the above described engine system may use the inferred VGT vane position to infer an exhaust back pressure (EBP) of the engine exhaust system. By inferring the EBP based on the inferred VGT vane position an EBP sensor may be eliminated from the engine exhaust system and the engine system complexity and cost of the engine system may be reduced.

Figure 5:
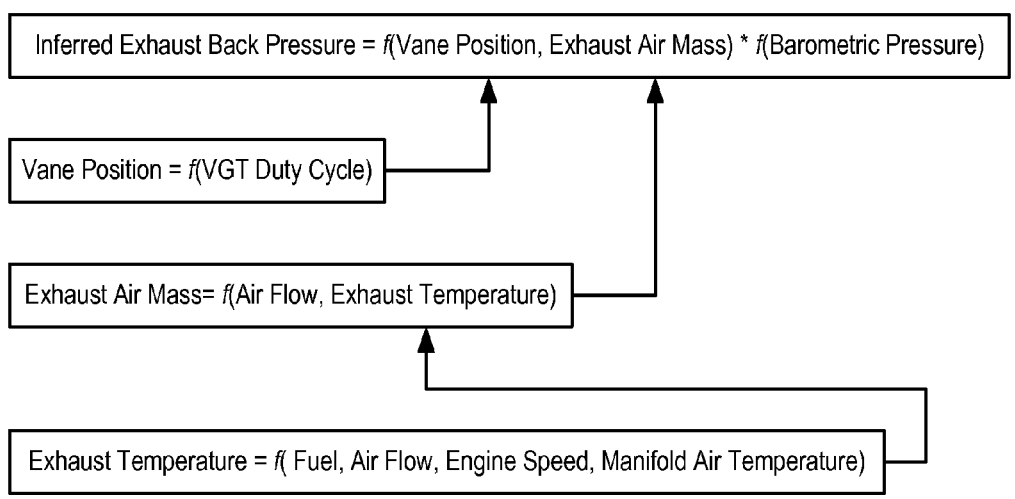
FIG. 5 shows a model for estimating exhaust back pressure using an inferred VGT vane position.

Referring now to FIG. 5, an example model for inferred exhaust back pressure is shown. The illustrated model shows how EBP may be inferred from and inferred VGT vane position. The inferred exhaust back pressure may be determined as a function of exhaust air mass and an orifice reference of the VGT. In particular, the VGT duty cycle to vane position learning method as describe above may provide a defined reference for the variable orifice (e.g. inferred VGT vane position) and an exhaust temperature model may be used to adjust exhaust air volume as a function of air temperature. Additionally, the inferred exhaust back pressure model may include a compensation for barometric pressure effects. Furthermore, the exhaust temperature model may be a function of fuel, air flow, engine speed, and manifold air temperature. Note that these models are exemplary and other operating parameters may be used to estimate exhaust back pressure.

Furthermore, the inferred exhaust back pressure may be used to adjust various engine operations. For example, the EBP may be used to control operation of the EGR system. In particular, the EGR valve may be adjusted based on the EBP in order to control exhaust flow in the combustion chambers for combustion. As another example, the VGT may be controlled based on the EBP.

It will be appreciated that the configurations and routines disclosed herein are exemplary in nature, and that these specific embodiments are not to be considered in a limiting sense, because numerous variations are possible. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of operation for an engine system, the engine system having a variable geometry turbocharger with a vane, the vane having a variable position, the method comprising:
adjusting an EGR valve to fully closed prior to adjusting the vane of the variable geometry turbocharger; then
adjusting the vane of the variable geometry turbocharger through a range of operation by stepping through a plurality of vane positions and holding at each of the plurality of positions, the range spanning from a substantially minimum position to a substantially maximum position of the variable geometry turbocharger; and
adjusting operation of an engine in response to the vane adjustment.

2. The method of claim 1 wherein the vane position is adjusted by adjusting an actuatory command signal, the actuatory command signal being a duty cycle.

3. A method of operation for an engine system, the engine system having a variable geometry turbocharger with a vane, the vane having a variable position, the method comprising:
adjusting at least one of a throttle plate to fully open and an EGR valve to fully closed prior to adjusting the vane of the variable geometry turbocharger; then
adjusting the vane of the variable geometry turbocharger through a range of operation by stepping through a plurality of vane positions and holding at each of the plurality of positions, the range spanning from a substantially minimum position to a substantially maximum position of the variable geometry turbocharger; and
adjusting operation of an engine in response to the vane adjustment, wherein adjusting operation includes determining degradation of at least one of a vane actuator and a vane position, and operating the engine under a default action in response thereto, said default action including discontinuing adaptive learning of vane position.

4. The method of claim 3 wherein the default action includes suspending vane position adjustment.

5. The method of claim 1 wherein adjusting operation includes determining an inferred vane position with an intake manifold pressure sensor and adjusting a vane actuator to control vane position based on the inferred vane position.

6. The method of claim 1 wherein adjusting operation includes inferring exhaust backpressure based on an inferred vane position and adjusting the EGR valve based on the inferred exhaust backpressure to adjust an exhaust gas flow.

7. The method of claim 1 further comprising adjusting the vane during an idle condition.

8. The method of claim 1 wherein the plurality of vane positions is related to intake manifold absolute pressure.

9. The method of claim 1 wherein the substantially minimum position corresponds to at least one of a low air flow and a low speed, and the substantially maximum position corresponds to at least one of a high air flow and a high speed.

10. The method of claim 1 wherein one of the plurality of vane positions is a mid-range position between the substantially minimum position and the substantially maximum position.

11. A method of operating an engine, comprising:
closing an EGR valve;
adjusting a turbocharger vane through a range of operation spanning from a substantially minimum position to a substantially maximum position while said EGR valve is closed;
sampling an operating parameter responsive to adjusting the turbocharger vane;
inferring a turbocharger vane position from an intake manifold pressure sensor; and
adjusting operation of the engine based on the inferred turbocharger vane position.

12. The method of claim 11 wherein adjusting the vane includes stepping through a plurality of duty cycles between minimum and maximum duty cycles and holding at each of the plurality of duty cycles.

13. The method of claim 12 wherein sampling includes sampling a value of the operating parameter during each hold at each of the plurality of duty cycles.

14. The method of claim 11 wherein adjusting the vane is performed during an idle condition.

15. The method of claim 11 wherein adjusting the vane is performed in response to a memory clear, and sampling includes storing operating parameter values in keep alive memory.

16. The method of claim 11 wherein adjusting operation includes determining degradation of at least one of a vane actuator and the turbocharger vane position and operating the engine under a default action in response thereto.

17. The method of claim 12 further comprising:
inferring an exhaust backpressure based on the inferred vane position; and
adjusting exhaust system operation based on the inferred exhaust backpressure.

18. A method of operation for an engine system, the engine system having a variable geometry turbocharger with a vane, the vane having a variable position, the method comprising:
adjusting the vane through a range of operation, the range spanning from a substantially minimum vane position to a substantially maximum vane position of the variable geometry turbocharger;
receiving a signal indicative of vane position from a vane position sensor;

sampling an operating parameter responsive to adjusting the vane;
inferring a vane position from an intake manifold pressure sensor; and
adjusting engine operation to a default condition in response to the vane position sensor and the inferred vane position differing beyond a limit, said adjusting engine operation including discontinuing adaptive learning of vane position and discontinuing variable geometry turbocharger operation.

19. The method of claim 18 wherein adjusting engine operation includes suspending operation of the variable geometry turbocharger based on the vane position sensor and adjusting the vane is performed during an idle condition.

* * * * *